United States Patent [19]

Maria van Woesik

[11] Patent Number: 5,408,551
[45] Date of Patent: Apr. 18, 1995

[54] OPTICAL COUPLING DEVICE

[75] Inventor: Egbertus T. C. Maria van Woesik, NN's-Hertogenbosch, Netherlands

[73] Assignee: The Whitaker Corporation, Wilmington, Del.

[21] Appl. No.: 156,521

[22] Filed: Nov. 22, 1993

Related U.S. Application Data

[63] Continuation of Ser. No. 987,881, Dec. 9, 1992, abandoned.

[30] Foreign Application Priority Data

Dec. 24, 1991 [GB] United Kingdom ................ 8127369
Dec. 24, 1991 [GB] United Kingdom ................ 9127367

[51] Int. Cl.$^6$ ............................ G02B 6/00; G02B 6/36
[52] U.S. Cl. .......................................... 385/28; 385/50
[58] Field of Search ............ 385/27, 28, 31, 32, 385/39, 50

[56] References Cited

U.S. PATENT DOCUMENTS

| | | |
|---|---|---|
| 3,969,016 | 7/1976 | Kaiser et al. ............................. 385/28 |
| 4,125,315 | 11/1978 | Altman et al. ........................ 385/147 |
| 4,184,740 | 1/1980 | d'Auria et al. ........................ 385/16 |
| 4,200,356 | 4/1980 | Hawkes et al. ........................ 385/16 |
| 4,676,594 | 6/1987 | Presby ............................... 385/28 X |
| 4,993,794 | 2/1991 | Young et al. .......................... 385/28 |
| 4,995,692 | 2/1991 | Diliello et al. ....................... 385/16 |
| 5,018,814 | 5/1991 | Jannson et al. ....................... 385/28 |
| 5,054,874 | 10/1991 | Hill et al. ............................. 385/28 |
| 5,058,979 | 10/1991 | Yamauchi et al. ..................... 385/28 |

Primary Examiner—Akm E. Ullah
Attorney, Agent, or Firm—Eric J. Groen

[57] ABSTRACT

An optical coupling device comprises a pair or connectors each receiving a bundle of optical fibers. Each connector is received in a housing which also receives an optical end of an optical mixing rod. A selected optical fiber of one of the bundles, when emissive, luminates the optical ends of all of the fibers in the other connector. The mixing rod has a central curved portion connecting rectilinear portions each of which is received in a respective one of the connectors. The arc of curvature of the curved portion of the mixing rod is such that light emitted by the emitting fibers is substantially equally distributed amongst the receiving fibers.

19 Claims, 13 Drawing Sheets

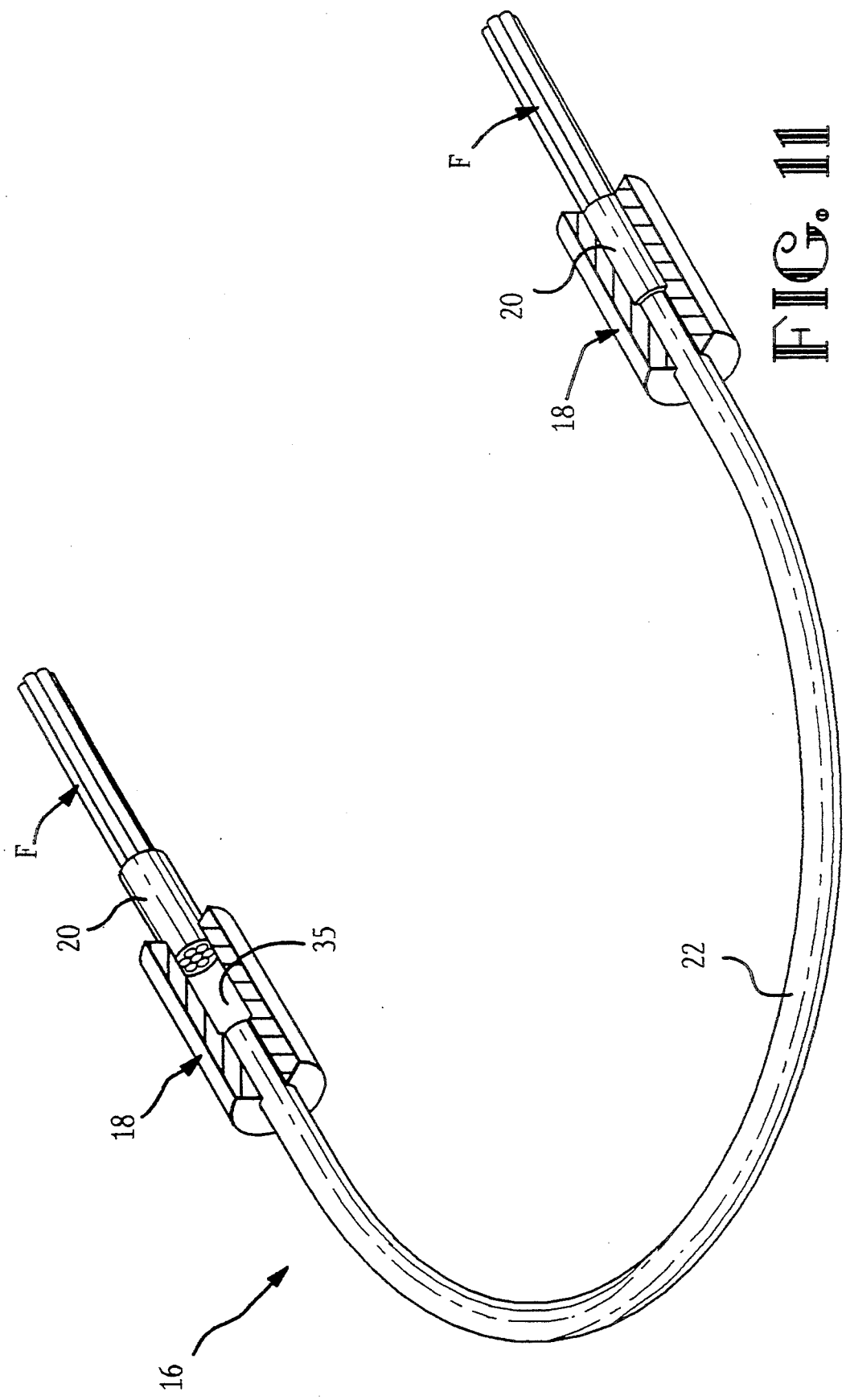

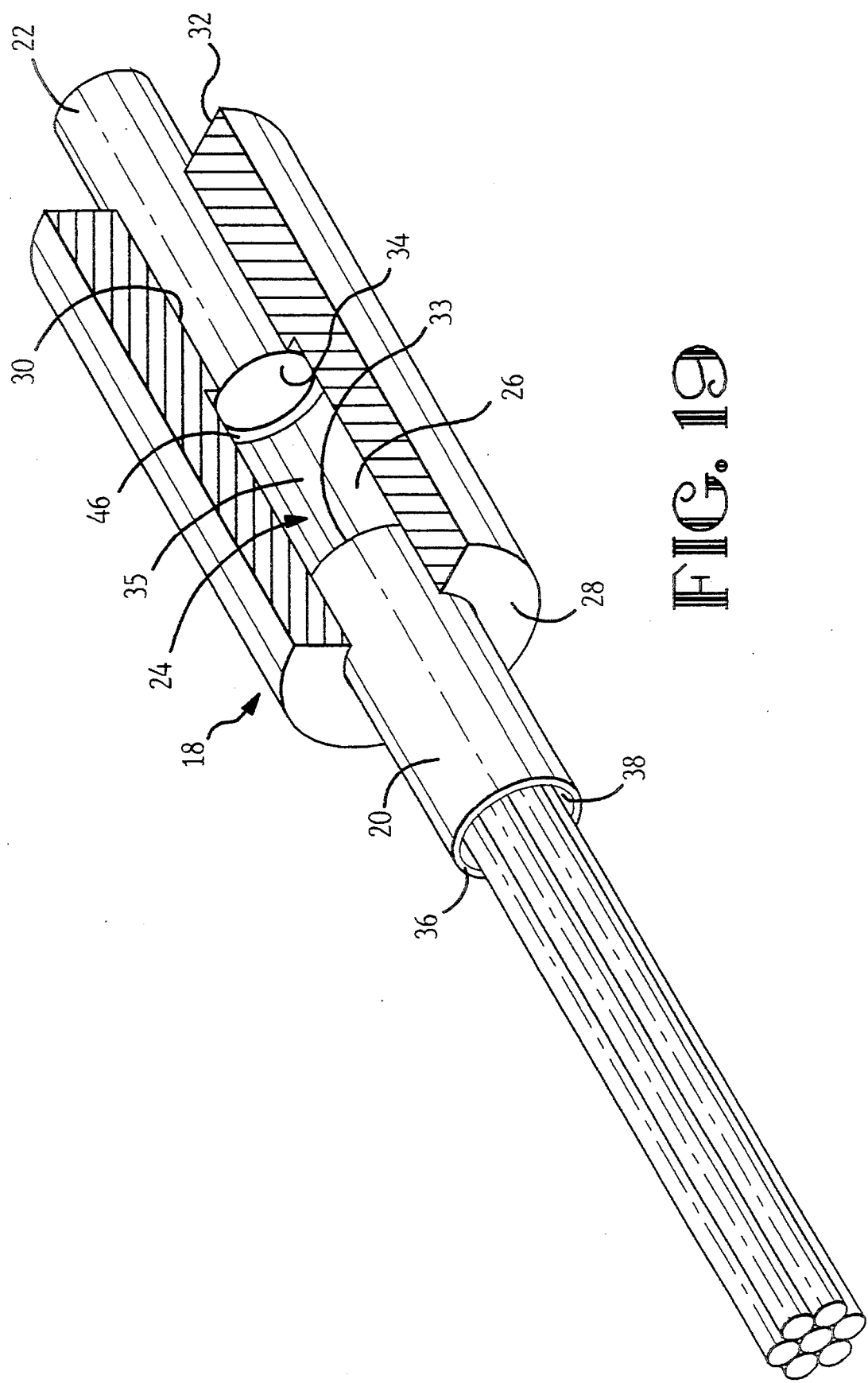

OPTICAL COUPLING DEVICE

This application is a Continuation of application Ser. No. 07/987,881 filed Dec. 9, 1992, now abandoned.

BACKGROUND OF THE INVENTION

1. Field of the Invention

This invention relates to an optical coupling device for transmitting light emitted by a first optical fibre to each of a plurality of second optical fibres.

Such a coupling device is disclosed in an article entitled POLYMERIC OPTICAL MIXING ROD COUPLER by L. L. Blyler and G. J. Grimes, of A. T. and T. Bell Laboratories, published in the proceedings of the 39th Electronic Conference, Houston, Tex., 1989, Pages 490 to 493. This known coupling device comprises a rectilinear mixing rod consisting of a Teflon (registered Trade Mark) tube filled with a transparent casting resin. A bundle of optical fibres is received in one end of the tube and a single large fibre is received in the other end thereof. The device may be operated as a light splitter or as a light combiner.

A further known optical coupling device, which is described in detail below, with reference to FIGS. 1 to 5 of the accompanying drawings, comprises first and second tubular connectors receiving the first and second optical fibres, respectively, with a cladded, optical end of each fibre exposed at a forward end of the respective connector, and an optical mixing rod interposed between the forward ends of the connectors, the mixing rod having optical ends optically interfaced with the optical ends of the first and second optical fibres, respectively, so as to distribute light emitted by the first optical fibre to illuminate the optical ends of the second optical fibres. The mixing rod of this further known optical coupling device, is rectilinear.

Such optical coupling devices, which are known as star couplers, are used for example in automotive vehicles, in optical instruments, for industrial automation, or for monitoring sensors in a machine, where it is required that a single light signal be transmitted to a plurality of light sensitive devices.

It has been found however, as described in greater detail below, that where such a rectilinear mixing rod is used, not all of the second fibres, that is to say the receiving fibres, are illuminated to an equal extent when the first fibre is emissive, so that the illumination of some of the second fibres may be inadequate. This disadvantage occurs, because the optical power transmitted by the mixing rod decreases in a direction away from the longitudinal central axis of the mixing rod.

SUMMARY OF THE INVENTION

According to the present invention, the mixing rod comprises a curved central portion connecting first and second rectilinear portions of the mixing rod, each of these second portions terminating in a respective one of the optical ends of the mixing rod.

By virtue of the curvature of the mixing rod, the light proximate to the longitudinal axis of the mixing rod, is constrained by the curvature thereof, so as to be reflected at different angles from the curving of the mixing rod to provide substantially uniform light distribution throughout the cross section of the emitting end of the mixing rod whereby the receiving fibres are substantially equally illuminated. The cross sectional shape of the mixing rod may be circular, or it may be other than circular, for example, in the case of a two fibre-to-two fibre coupling device.

It has been found that where the coupling device comprises two bundles, each of seven fibres, equality of light distribution in the mixing rod is optimum, where the arc of curvature of the curved portion of the mixing rod is 180°, the optimum radius of the curved portion being approximately 45 mm, although considerably improved light distribution can be attained where a said arc of curvature is between 30° and 180°. Other values are optimum where the bundles of fibres comprise other numbers of fibres.

The radius of curvature of the mixing rod, which will depend partly upon mechanical considerations, may be between 20 mm and 50 mm. For a thirteen fibre-to-thirteen fibre coupling device the mixing rod core diameter is preferably 4.52 mm and for a nineteen fibre-to-nineteen fibre coupling device said diameter is preferably 5.07 mm. The mixing rod may be of non-circular cross section where, for example, the coupling device is a two fibre-to-two fibre device. In the commercial production of optical fibres, the fibres when produced, are reeled for transport to the end user. A disadvantage of an internally smooth-walled connector, is that since the fibres have a plastic memory and thus tend, when dereeled, to bend so as to return towards their reeled configurations, the longitudinal axes of the fibres do not, if the fibres of a bundle are inserted together into the connector, align themselves with the longitudinal axis of the connector. In order to avoid this disadvantage, which would cause light to be coupled out of the system, thereby causing attenuation of the transmitted light, the current practice is to insert th fibres of a bundle into the connector one by one, or to confine the bundle of fibres by means of an O-ring, tape or tube, to ensure that the fibres extend parallel to the longitudinal axis of the connector when inserted thereinto.

According to one aspect of the invention, a tubular connector in a coupling device of the kind referred to above is formed with a series of internal peripheral, axially extending fibre guiding grooves opening into the forward end of the connector, each groove receiving a respective outer fibre of the bundle, these respective outer fibres retaining at least a central fibre of the bundle firmly into position in parallel relationship with said respective outer fibres.

The fibres of the bundle can accordingly be inserted simultaneously into the connector without the disadvantage mentioned above.

Each groove preferably has a fibre lead-in rear portion tapering in width and depth towards a fibre lead-in mouth opening into the rear end of the connector and tapering forwardly of the connector.

According to another aspect of the invention, a tubular connector for confining a bundle of optical fibres, the connector having a forward end and a rear end, is characterised in that the rear end has a rearwardly flared, internally smooth, fibre lead-in mouth, therebeing formed in the wall of the connector, a series of internal peripheral, fibre guiding grooves of smoothly arcuate, concave cross-section and of identical dimensions and configuration matched to the fiber diameter, communicating with the mouth and opening into the forward end of the connector, the grooves being uniformly spaced from each other about the longitudinal axis of the connector, each groove having a fibre lead-in rear end portion which tapers both in width and depth towards said mouth.

According to yet a further aspect thereof, the invention consists in a method of confining a number n of optical fibres by inserting them axially into a tubular connector, for interfacing optical ends of the fibres with an optical end of a light mixing rod or large core optical wave guide; the method being characterised by the steps of; providing a tubular connector which is formed with a number n-x of axially extending internal peripheral grooves opening into a forward end of the connector, and a rearwardly flared mouth communicating with the grooves and opening into a rear end of the connector; axially inserting the fibres simultaneously into the connector guided by the flared mouth so that a leading end of each fibre protrudes slightly beyond the forward end of the connector, and so that each groove receives a respective fibre, whereby all of the fibres are held in parallel relationship with the longitudinal axis of the connector; bonding the fibres into the connector by means of a bonding material index matched to the cladding of the fibers; allowing the bonding material to cure; and polishing the leading ends of the fibres flat and perpendicular to the longitudinal axis of the connector to provide optical ends thereon level with the forward end of the connector.

The number of fibres may be seven, the number of grooves being six. In this case, a single fibre is held in alignment with the longitudinal axis of the connector. The bundle of fibres, may however comprise a much greater number fibres, for example thirty two fibres. In this case, the outer fibres of the bundle, will hold a substantial number of inner fibres, in parallel relationship with the longitudinal access of the connector.

BRIEF DESCRIPTION OF THE DRAWINGS

FIG. 11 is an enlarged second isometric view of the coupling device of FIG. 8;

FIG. 19 is an enlarged isometric view, shown partly in section, illustrating details of FIG. 8;

DETAILED DESCRIPTION OF THE PREFERRED EMBODIMENT

Figure 1:
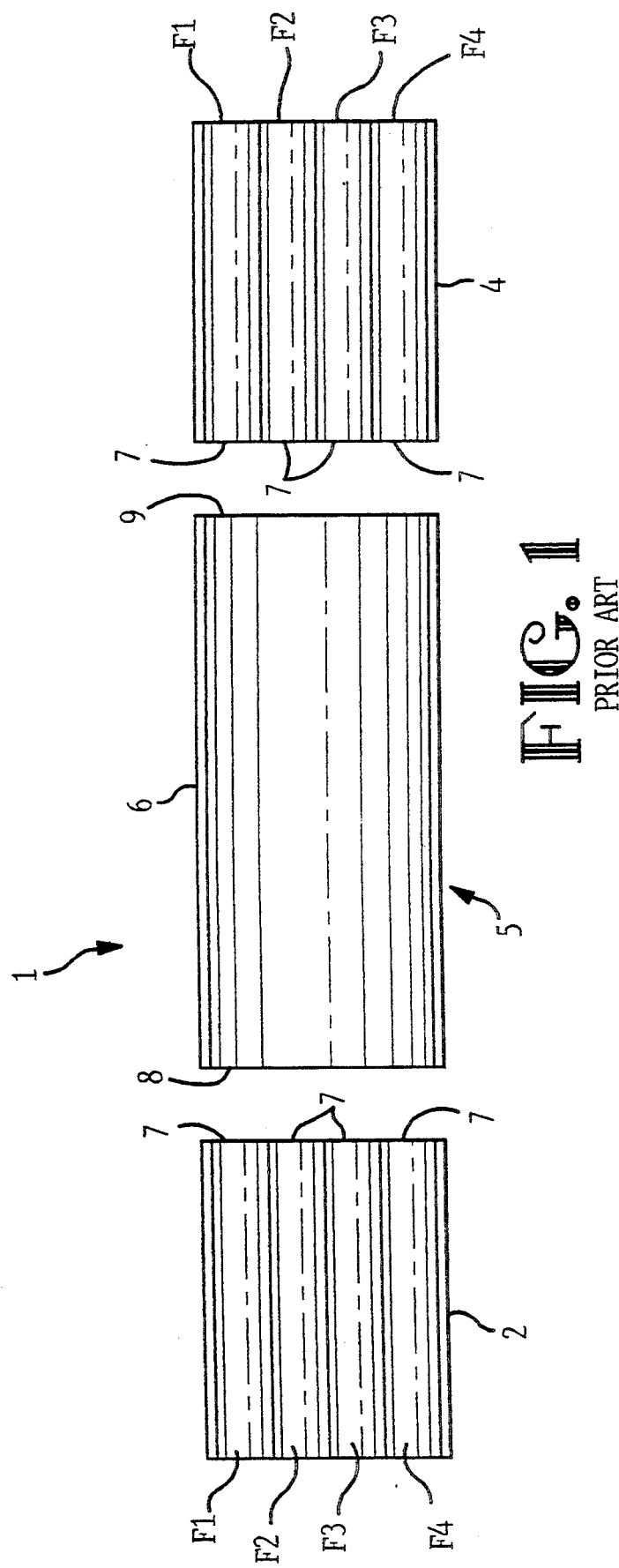
FIG. 1 is a diagrammatic side view of a known optical star coupling device comprising a pair of optical fibre connectors each receiving a bundle of optical fibres, and a rectilinear optical mixing rod.
Figure 2:
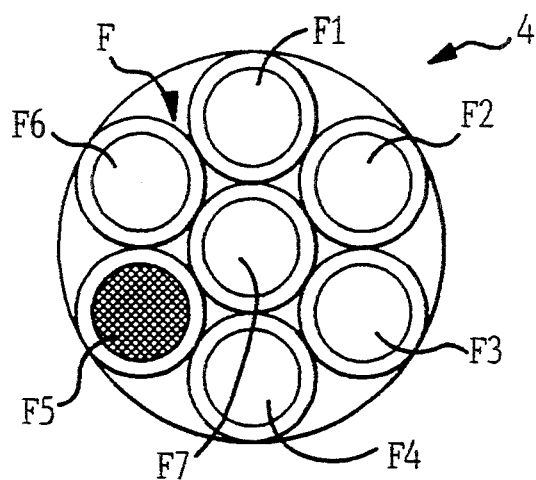
FIGS. 2 and 3 are front end views of respective ones of the connectors illustrating an aspect of the operation of the known coupling device.
Figure 3:
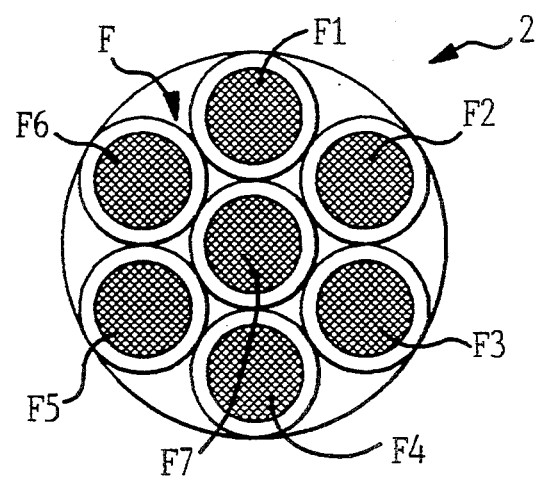
Figure 4:
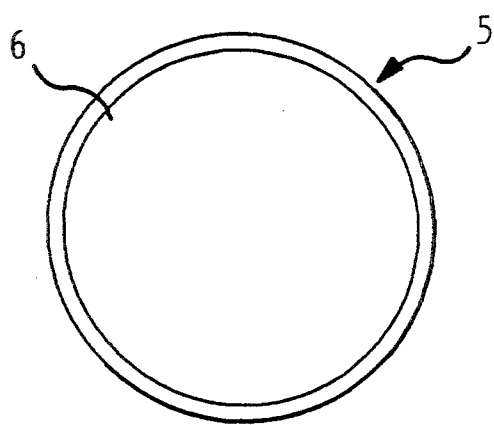
FIG. 4 is an end view of the optical mixing rod of the device shown in FIG. 1.

A known optical star coupling device 1 for guiding light from a single optical fibre of a plurality thereof, into a plurality of optical fibres will now be described from a theoretical point of view with reference to FIGS. 1 to 4. The coupling device 1 comprises a pair of optical fibre connectors 2 and 4, respectively, each receiving and mechanically confining a bundle F of optical fibres, F1 to F7, respectively, and a rectilinear constant cross section optical mixing rod 5 provided with cladding 6. The rod 5 is of circular cross-section according to the present example, and may be described as an optical wave guide. Such a wave guide could, however, be of rectangular cross-section. The polished optical ends 7 of the fibres of each bundle butt against, at optical interfaces, and are connected to, the respective flat optical end faces 8 and 9 of the mixing rod 5. Each connector 2 and 4 is in the form of a simple tubular ferrule, which is smooth walled both internally and externally, and which, in this example is of circular cross-section. When one fibre for example, the fibre F5 in the connector 4 is light emissive, as indicated by hatching, the light from the fibre F5 is guided by the mixing rod 5 so as to illuminate the ends of all of the fibres F1 to F7 in the connector 2, also as indicated by hatching. Alternatively, a selected fibre in the connector 2 could be made emissive so as to illuminate the ends 7 of all the fibres in the connector 4. Such a coupling device is used for example in an optical control system, for example in a motor vehicle, an optical instrument, for industrial automation, or for monitoring sensors in a machine; where it is required that a single light signal be transmitted to a plurality of light sensitive devices.

Figure 5:
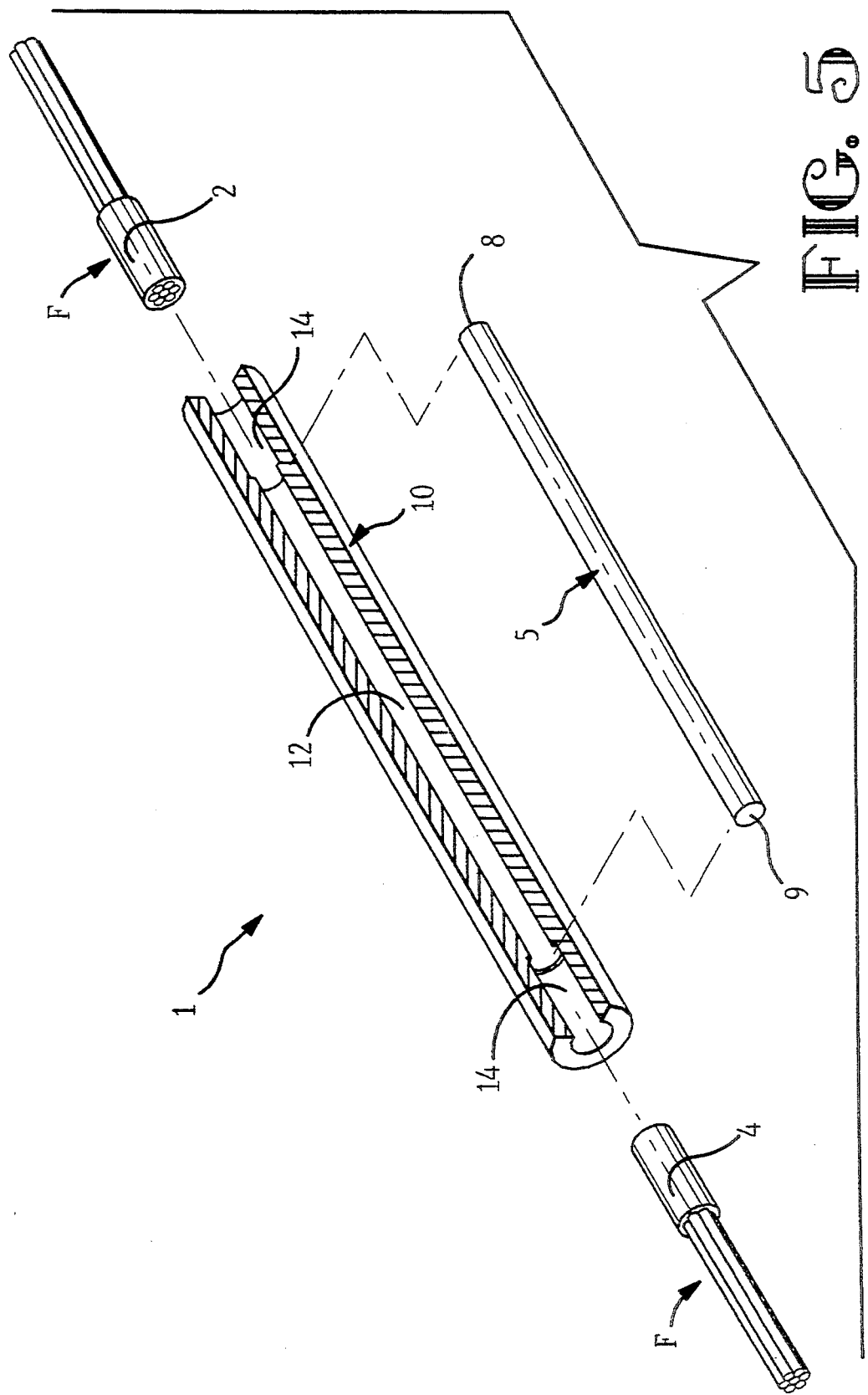
FIG. 5 is an exploded isometric view of a practical example of the known coupling device illustrated diagrammatically in FIGS. 1 to 4.

As shown in FIG. 5, in a practical example of the known optical coupling device, the connectors 2 and 4 with bundles of fibres F received therein are accommodated in a housing 10 having a central bore 12 receiving the rod 5, each connector 2 and 4 being snugly received in a respective end portion 14 of the bore 12.

Figure 26:
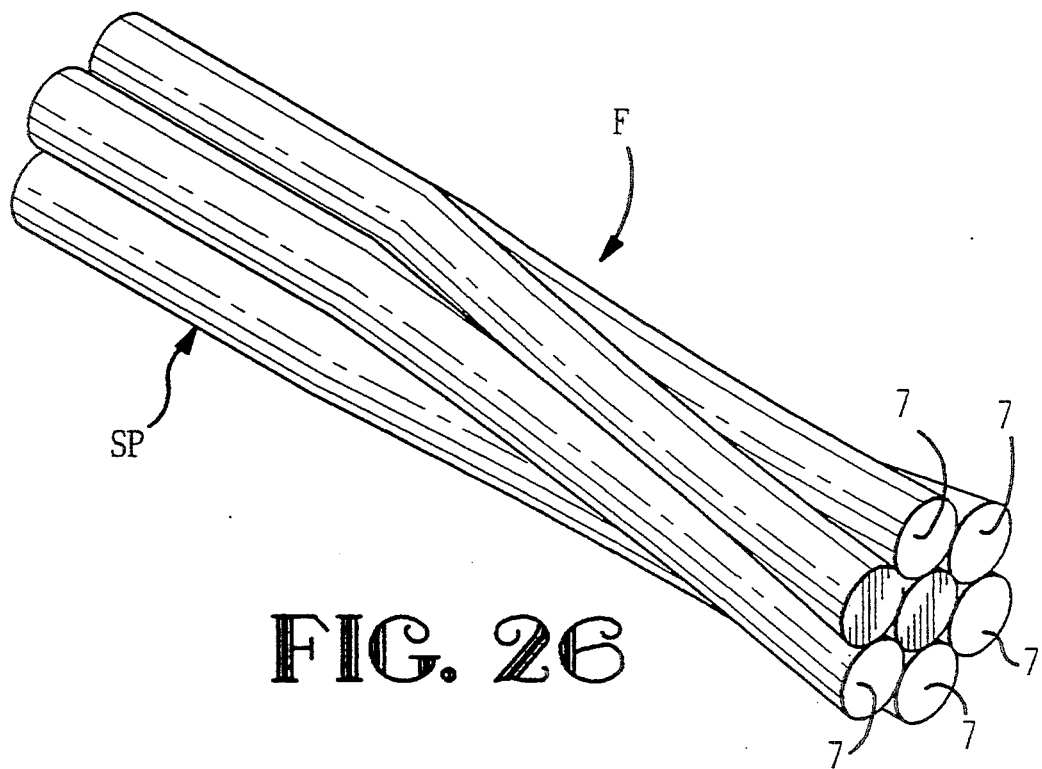
FIGS. 26 and 27 are an enlarged isometric view and side view, respectively, illustrating the behaviour of fibres in a bundle of optical fibres to be inserted into a connector therefor.
Figure 27:
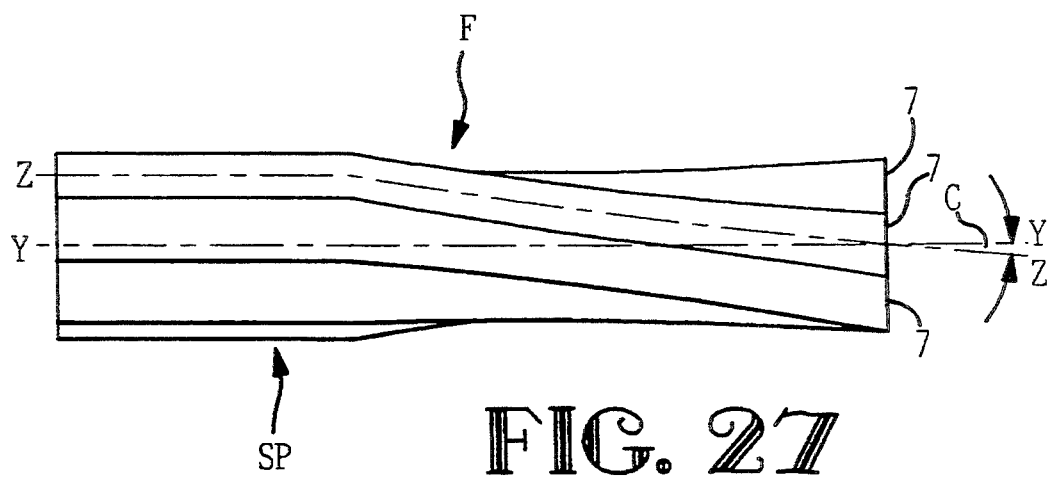

In the commercial production of optical fibres, the fibres when produced, are reeled for transport to the end user. A disadvantage of an internally smooth walled connector, is that since the fibres F1 to F7 have a plastic memory and thus tend, when de-reeled, to bend so as to return towards their reeled configurations, the longitudinal axes of the fibres, do not, if the fibres of a bundle are inserted together into the connector, align themselves with the longitudinal axis of the connector. As shown in FIGS. 26 and 27, is a bundle of fibres F, the fibres tend to twist from straight positions SP thereof so as to tilt with respect to the longitudinal axis Z—Z of the bundle, so that the longitudinal axis Y—Y of a twisted fibre is displaced from the axis Z—Z by an angle t of tilt, whereby the optical end faces 7 of the fibres are displaced, with respect to the straight positions SP. In order to avoid this disadvantage, which would cause light to be coupled out of the system, thereby causing attenuation of the transmitted light, the current practice is to insert the fibres of a bundle into the connector one by one, or to confine the bundle of fibres by means of an Oring, tape or tube to ensure that the fibres extend parallel to the longitudinal axis of the connector when inserted thereinto.

Although a typical seven fibre-to-seven fibre coupling device has been described above by way of example, such a coupling device, can comprise a multiplicity of fibres in each bundle.

In order to ensure that each of the receiving fibres is illuminated to the same extent, the distribution of the light achieved by the mixing rod should, as far as possible, be equal. Uniformity defined as the difference between the highest and the lowest power measured at all the input ports and output ports of the coupling device, should, therefore, be as low as possible.

Figure 6:
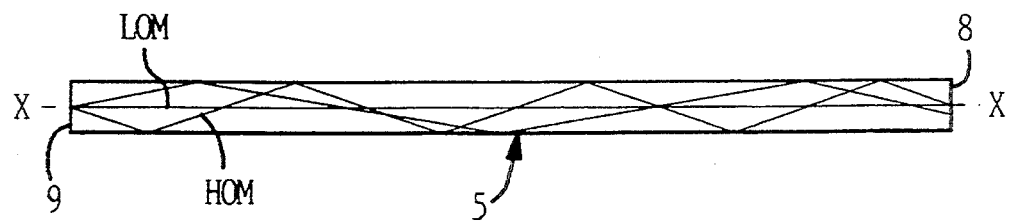
FIG. 6 is an enlarged diagrammatic side view of the mixing rod of the device of FIG. 5, illustrating the propagation of light through the mixing rod.

In theory the greater is the length of the mixing rod 5, the lower is the uniformity. It has been found however, that even with the use of a mixing rod which is as long as 100 cm the equality of the light distribution is insufficient to ensure adequate illumination of all of the receiving fibres. In the rectilinear mixing rod 5 the optical power decreases in a direction away from a longitudinal central axis of the selected light emitting fibre. When, a central fibre F7, for example, of the connector 4, is emissive, the low order modes LOM that is to say the light beams proximate to the longitudinal axis X—X of the rod 5 propagate, as shown in FIG. 6, in the direction of the axis X—X, although the high order modes HOM, that is to say the light beams more remote from the axis X—X are reflected by the cladding 6 of the rod 5 and are thus better distributed than the low order modes LOM. The power measured at the middle receiving fibre F7 is accordingly substantially the greater, whereas the other receiving fibres F1 to F6, are, consequentially, illuminated to a lesser extent. Said uniformity is also insufficient where one of the fibres F1 to F6 is emissive.

A fibre optic star coupling device according to a preferred embodiment of the present invention will now be described with reference to FIGS. 7 to 19. As best seen in FIGS. 8 and 11, an optical star coupling device 16 for the same purpose as the known device 1, and also, being, by way of example, a seven fibre to seven fibre coupling device, comprises a pair of housings 18, a pair of connectors 20 receiving a bundle of optical fibres F and an optical mixing rod 22 of U-shaped configuration.

As best seen in FIG. 19, each housing 18, which is of circular crosssection, has a central axial bore 24 having a rear portion 26 of constant cross-section, opening into a connector receiving face 28 of the housing 18 and a forward portion 30 of smaller cross-section than the rear portion 26, opening into a mixing rod receiving face 22 of the housing 18. One of the connectors 20 extends partially into the bore portion 24, with an end face 33 of the connector 20 in spaced relationship with optical an end face 34 of one end portion of the mixing rod 22 the end face 34 may, as described below, be either the emissive, or the receiving end face of the rod 22. The space between the faces 33 and 34 constitutes the interface 35 between them as shown at the bottom of FIG. 8 and at the top of FIG. 11. The optimum situation is when the faces 33 and 34 are in contact, that is to say when there is no space between them as shown at the top of FIG. 8 and at the bottom of FIG. 11.

Figure 17:
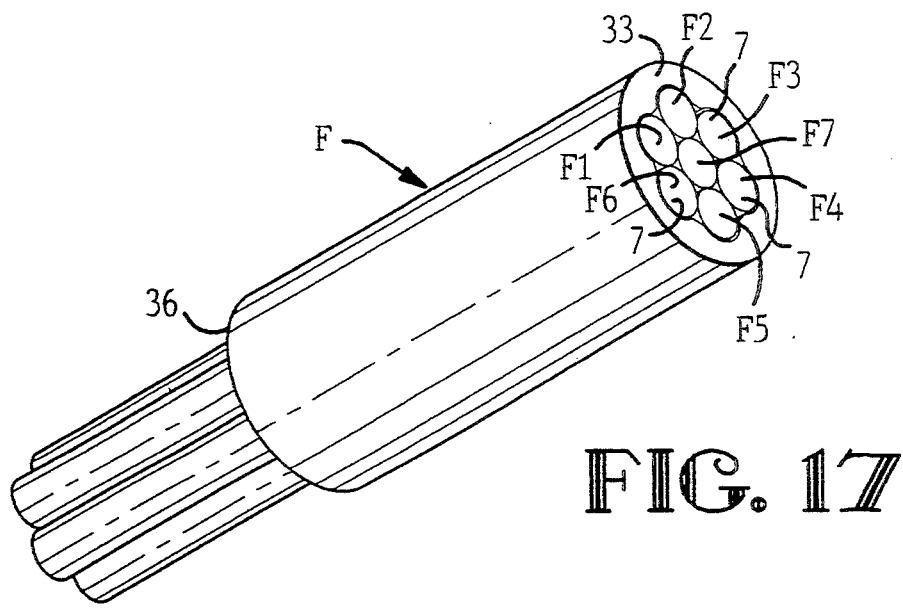
FIG. 17 is a front isometric view of the connector of FIGS. 12 to 16, when receiving a bundle of optical fibres.
Figure 18:
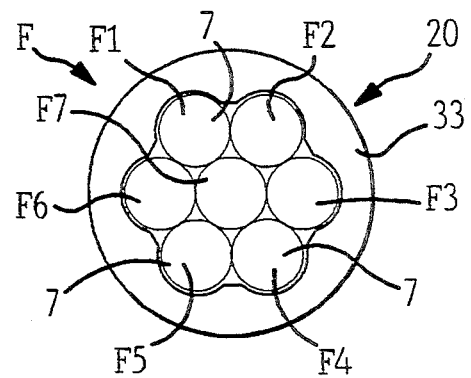
FIG. 18 is a front end view of FIG. 17.
Figure 22:
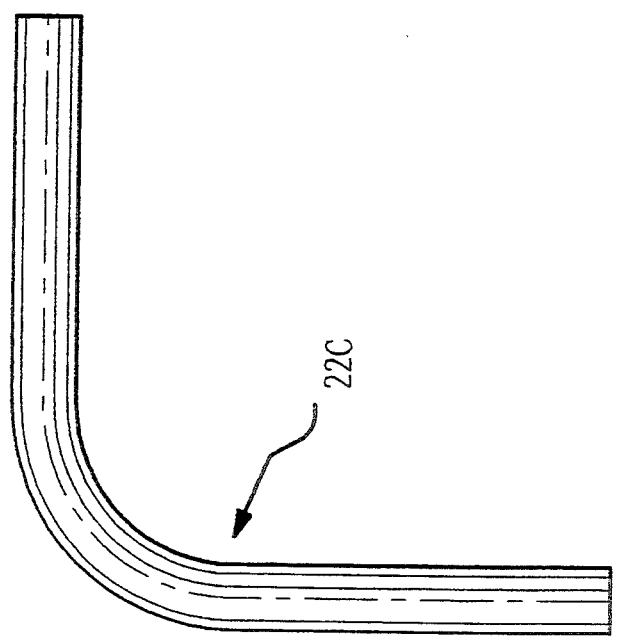
FIGS. 20 to 24 are enlarged side views of optical mixing rods according to embodiments other than said preferred embodiment.
Figure 21:
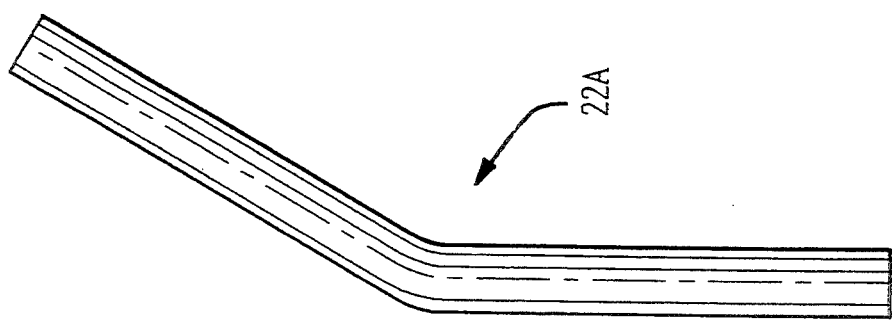
Figure 20:
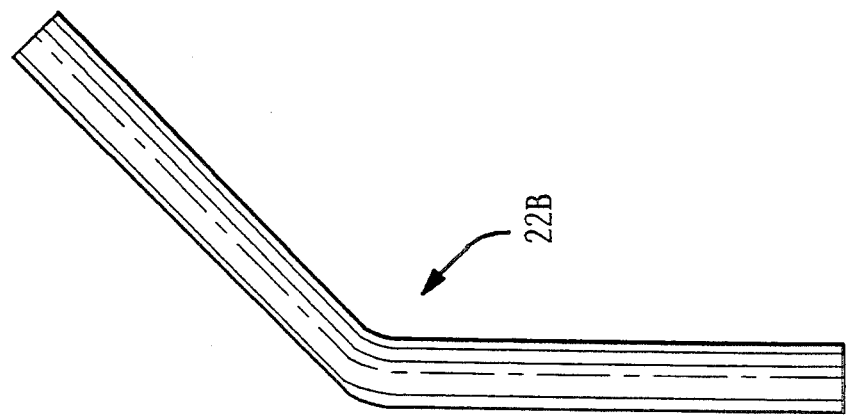
Figure 23:
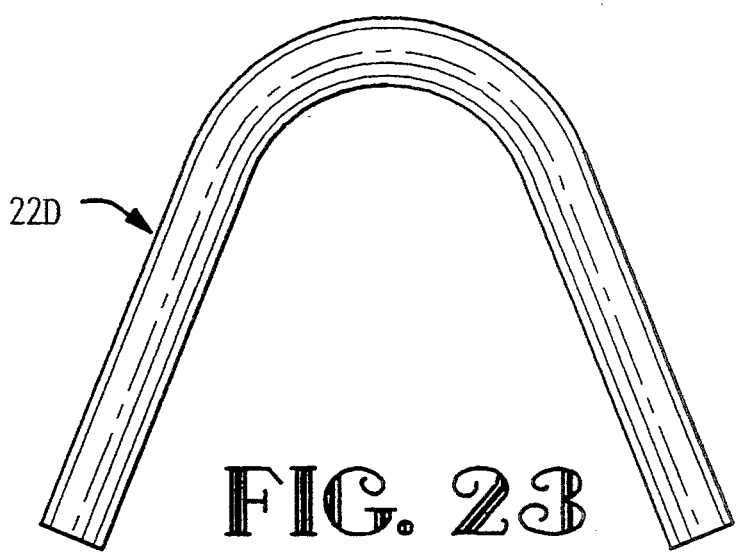

As best seen in FIGS. 13 to 16, each connector 20 which is in the form of an overall circular cross-section hollow tube, has a fibre bundle receiving rear end 36 having an outwardly flared, internally smooth, circular cross-section, frusto-conical fibre lead-in mouth 38. There extend axially of the connector 20, from its forward end 33, six parallel, internal, peripheral, fibre guiding axial grooves 40 which are of smoothly arcuate concave cross-section and are of identical dimensions and configuration matching the fibre diameter. The grooves 40 are constantly spaced from each other about the longitudinal axis of the connector 20 in a circular array and are separated from one another by flat topped axial splines 42. Each groove 40 has a fibre lead in rear end portion 44 which tapers both in width and in depth toward the mouth 38 and terminates at the forward end thereof. A bundle F of seven fibres F1 to F7 can readily be inserted into the connector 20 from its fibre receiving end 36, guided by the walls of the frusto-conical mouth 38 so that each of the outer fibres F1 to F6 of the bundle F, guided by the portion 44 of the respective groove 40 is received in the remainder of the groove 40, with the leading end of each fibre protruding slightly beyond the forward end 33 of the connector 20. The outer fibres F1 to F6 hold the centre fibre F7 firmly in its position along the central longitudinal axis of the connector 20, as best seen in FIGS. 17 and 18. The bundle of fibres F, so inserted into the connector 20, is bonded into the connector 20 by means of a bonding material which is preferably index matched with the cladding material of the fibres.. The leading ends of the fibres are then polished flat to provide optical ends 7 and so as to be level with the forward end 33 of the connector 20, when the bonding material has cured. The diameter of the core of each fibre is, in the present example, typically 0.98 mm, the fibre bundle diameter being 3.mm, overall.

The optical mixing rod 22 may be a large cross-section polycarbonate optical fibre having a cladding 46 (FIGS. 9 and 10); having refractive indices matched to the fibres 1 to 7. The core of the rod 22 may be of pure fused silica, the cladding being fused silica. In any event, provision must be made for light beams to be reflected in the light rod 22. To this end, the difference in refractive index between the core of the rod 22 and the cladding thereof must result in an N.A. (numerical aperture) matching to the fibres F1 to F7 or the rod 22 must be coated with a light reflective material, for example, silver or gold, which materials are ideal for the 660 nm wavelength range. The N.A. of the rod 22 may be between 0.4 and 0.7. The housings 18, are also preferably of a low refractive index material, the difference in the refractive index between the housing and the core of the rod 22, resulting in an N.A. of 0.50. Alternatively the housing 18 could have a reflective surface coating over the extent of the bore portion 30. In order to reduce insertion loss and to avoid fresnel losses, a refractive index matching liquid for the 660 nm wavelength may be disposed in the interface 35 between the end faces 33 and 34, although in this case the connectors should be provided with spring loaded adaptors restraining, in known fashion, their withdrawal from the housings. Said matching liquid has the advantage that it is received in the interstices between the fibres, which provide a reservoir allowing for thermal expansion and contraction of the connectors and the housing, the penetration of the matching liquid between the fibres being limited by capillary action. Alternatively, an ultra violet ray curable adhesive resin with the correct refractive index and transmission at 660 nm could be substituted for the index matching material, the housing being transparent. For the avoidance of extra transmission losses, the total active diameter of the fibres should be equal to that of the mixing rod, as far as possible, at the interface 35 between the end faces 33 and 34.

Figure 7:
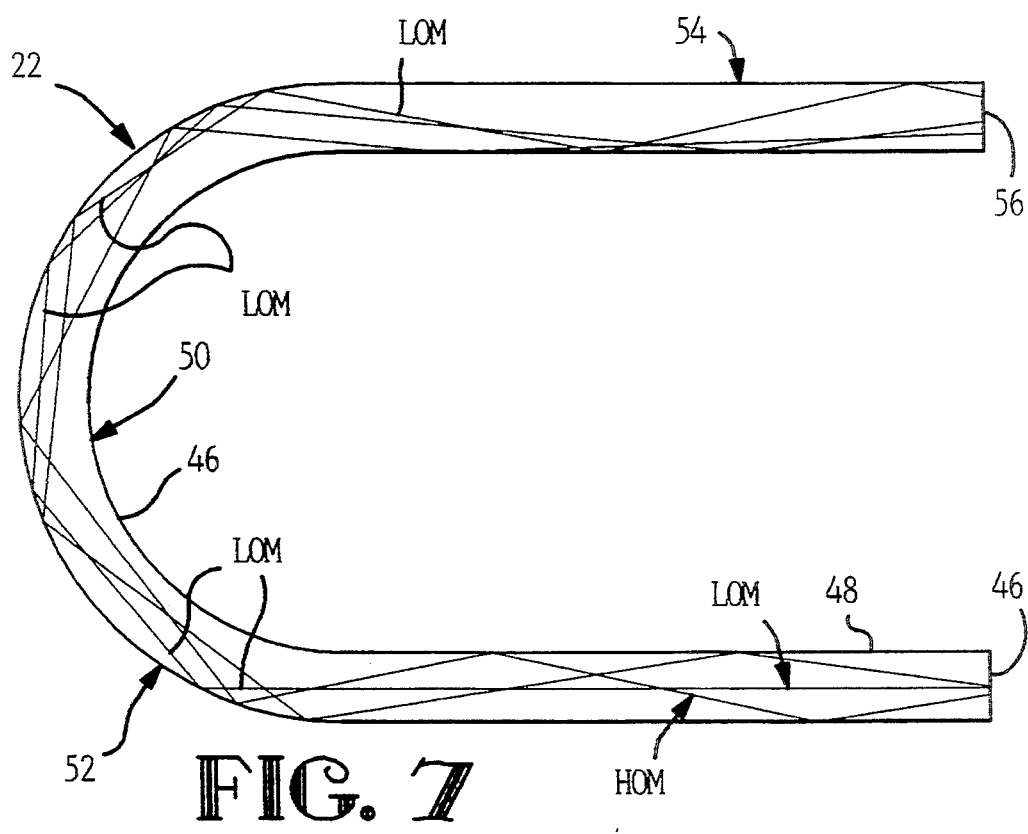
FIG. 7 is an enlarged side view of the optical mixing rod of an optical star coupling device according to a preferred embodiment of the present invention, illustrating the improved propagation of light therethrough.
Figure 8:
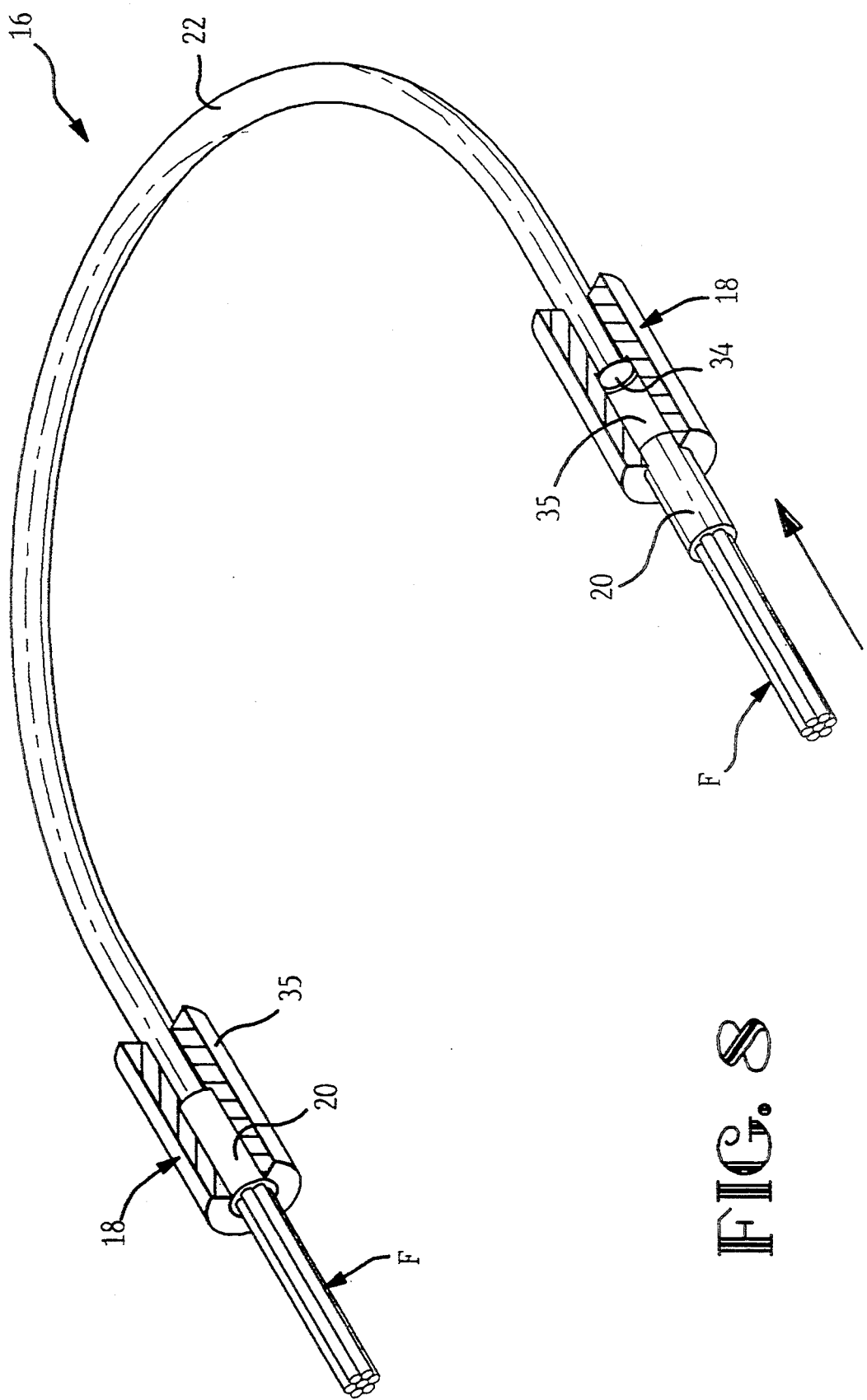
FIG. 8 is an enlarged first isometric view of the coupling device according to said preferred embodiment.
Figure 9:
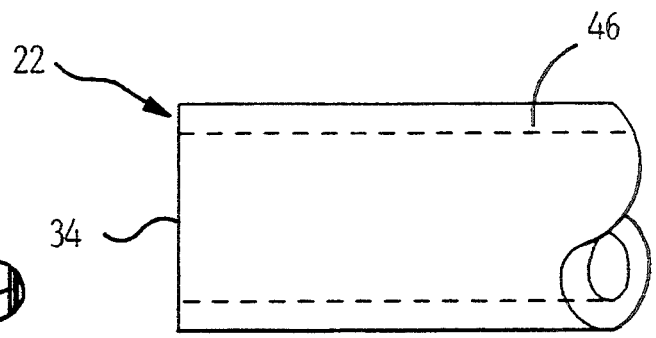
FIG. 9 is an enlarged, diagrammatic, fragmentary, side view of an end portion of the optical mixing rod of the device of FIG. 8, illustrating cladding thereon.
Figure 10:
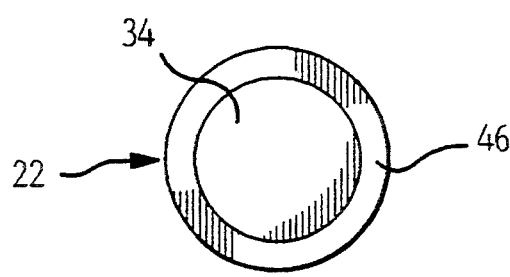
FIG. 10 is an end view of FIG. 9.
Figure 12:
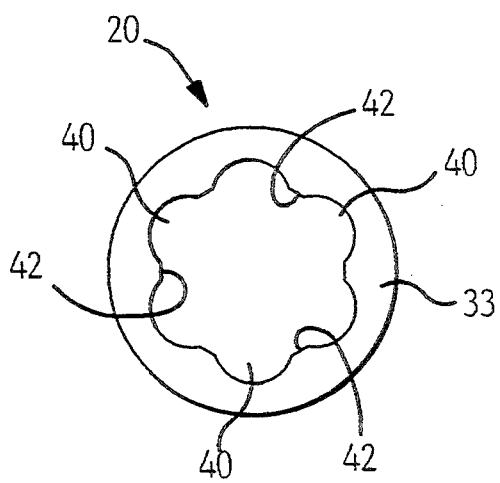
FIG. 12 is a front end view of an optical fibre connector of the coupling device of FIGS. 8 and 11.
Figure 13:
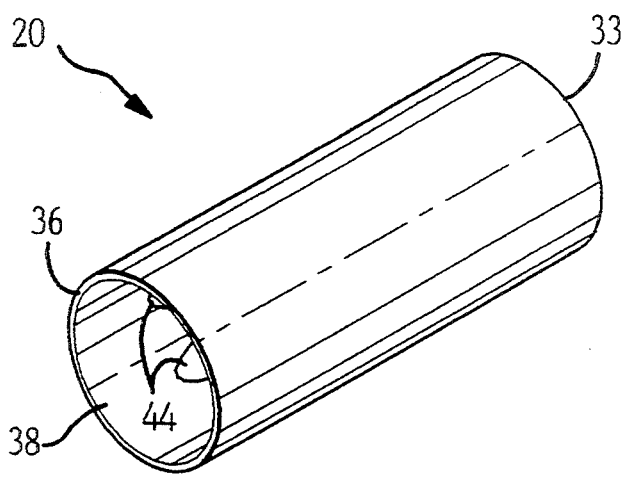
FIGS. 13 to 16 are a rear isometric view, a rear isometric view shown partly in longitudinal section, a front isometric view and a front isometric view shown partly in longitudinal section, respectively, of the connector of FIG. 12.
Figure 14:
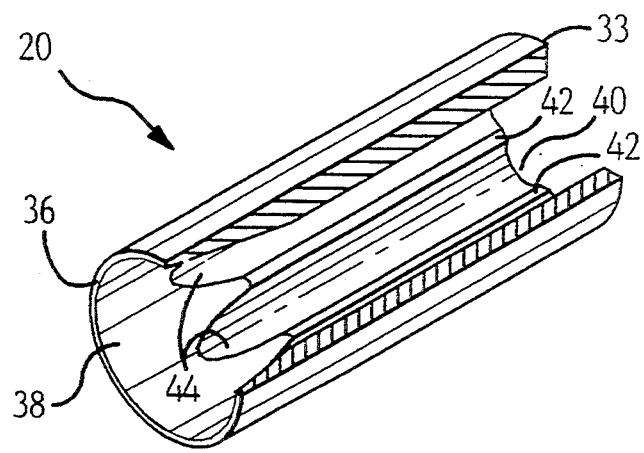
Figure 15:
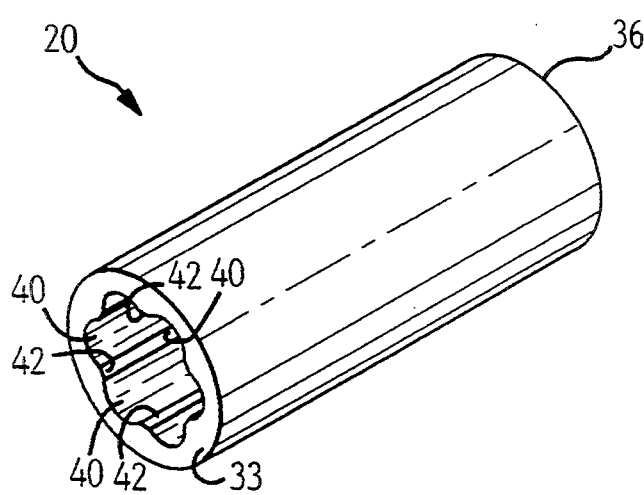
Figure 16:
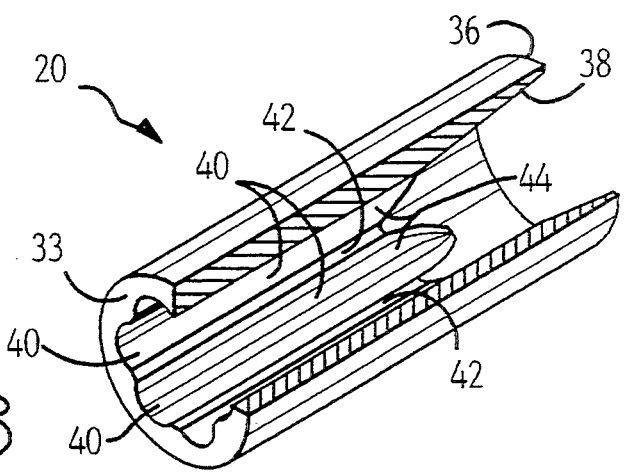

As shown in FIG. 7, the mixing rod 22 is so shaped that the low order modes LOM are forced to propagate other than in the axial direction. The distribution of the high order modes HOM is also improved. These improvements are achieved by virtue of the curvature of the mixing rod 22. The low order modes LOM, propagate from the notional light receiving optical end of the rod 22, which end is referenced 46 in FIG. 7, in a direction parallel to the central axis of the rod 22, along a first rectilinear portion 48 thereof, up to the central curved portion 50 of the rod 22, the low order modes LOM being reflected at the junction 52 between the portions 28 and 50 (at which junction the curvature of the rod 22 begins, as seen from the end 46), by the cladding 46 of the rod 22. Since, by virtue of said curvature, the angles of incidence of the modes LOM against the cladding 46, change as the modes LOM propagate along the curved portion 50, the modes LOM are reflected at different angles therealong so as to be well distributed upon reaching the second rectilinear portion 4 of the rod 22, leading to the notional light emitting optical end of the rod 22, which end is referenced 56 in FIG. 7, of the rod 22. The high order modes HOM are similarly reflected in the portion 50 of the rod 22 so that their distribution therein is also improved. Uniform light distribution throughout the cross section of the emitting end 56 is thereby achieved, so that the receiving fibres are thereby substantially equally illuminated, by the light emitted by the single light emiting fibre at the receiving end 46 of the mixing rod 22.

The rod 22, has for example an overall diameter of 3 mm, and an arc of curvature of 180° having a radius of 45 mm. It has been found that this selection of values produces equality of light distribution, such that the uniformity may amount to unity. In a seven fibre-to-seven fibre coupling device using a rectilinear rod according to the prior art, the uniformity may amount to 7 dB.

The end 56 of the rod 22 will, sometimes, during the use of the coupling device, be the light emitting end of the rod 22, the end 46 thereof being the light receiving end. The uniformity of light distribution in the rod 22 will in either case be as described above.

For some applications, the bundle of fibres in one of the connectors 20 may be replaced by a single large fibre tapered towards the interface to present a light receiving/transmitting end of the same diameter as one of the fibres in the other connector 20. The coupling device may thus be operated as a light combiner.

FIGS. 20 to 23 show optical mixing rods 22a to 22d, respectively, having arcs of curvature of 30°, 45°, 90°, and 135° respectively.

Figure 24:
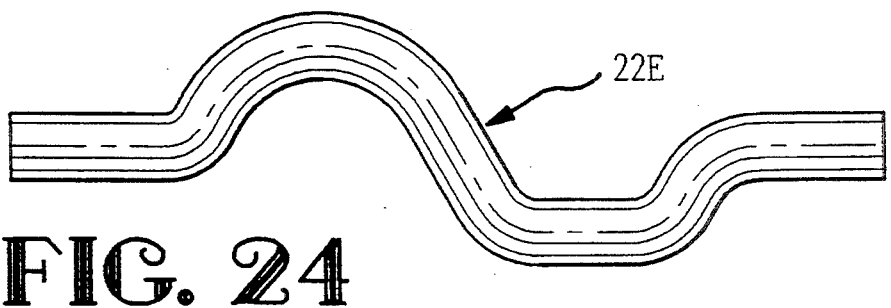

FIG. 24 shows a mixing rod 22e having a plurality of arcs of curvature of different value. Such arcs, or the combinations thereof shown in FIG. 24 may be selected for mechanical reasons, for example. The uniformity achieved by the use of these mixing rods, has been found to be better than that achieved with the use of a rectilinear mixing rod. The mixing rod may be curved in a single plane, as shown, or it may be of spiral, for example, helical, form.

Figure 25:
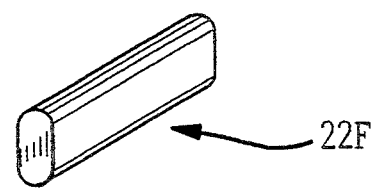
FIG. 25 shows end, and isometric views of mixing rods of other than circular cross sectional shape.

FIG. 25 shows mixing rods 22f of other than circular cross sectional shape, for use in a two fibre-to-two fibre coupling device.

I claim:

1. An optical coupling device for transmitting light emitted by a first optical fibre to each of a plurality of second optical fibers, the coupling device comprising; first and second tubular connectors receiving said first and second fibers, respectively, with an optical end of each fibre exposed at a forward end of the respective connector; and an optical, cladded mixing rod interposed between the forward ends of the connectors, the mixing rod having optical ends optically interfaced with optical ends of the first and second optical fibers, respectively, so as to distribute light emitted by the first optical fibre to illuminate the optical ends of the second optical fibers; the mixing rod comprising a curved central portion connecting first and second rectilinear end portions of the mixing rod, each terminating in a respective one of said optical ends of the mixing rod, characterized in that at least the second tubular connector is formed with a series of internal peripheral, axially extending, fibre guiding grooves opening into the forward end of the connector, each groove receiving a respective fibre of the bundle, these respective fibers retaining at least a central fibre of the bundle firmly in position in parallel relationship with respective fibers.

2. A device as claimed in claim 1, characterized in that each groove has a fibre lead-in rear portion tapering in width and in depth towards a fibre lead-in mouth opening into the rear end of the connector and tapering forwardly thereof, 3. A device as claimed in claim 1, characterized in that the curved portion of the mixing rod is curved through an arc of between 30° and 180°

4. A device as claimed in claim 1, characterized in that the curved portion of the mixing rod is curved through an arc of approximately 180°.

5. A device as claimed in claim 1, characterized in that the radius of curvature of said curved portion of the mixing rod is between 20 mm and 50 mm.

6. A device as claimed in claim 1, characterized in that the radius of curvature of said curved portion is approximately 45 mm, the mixing rod having an overall diameter of approximately 3 mm, where each of the connectors receives seven optical fibers.

7. A device as claimed in claim 1, characterized in that the mixing rod has a core diameter of approximately 4.52 mm, where each connector receives thirteen fibers.

8. A device as claimed in claim 1, characterized in that the mixing rod has a core diameter of approximately 5.07 mm, where each connector receives nineteen fibers.

9. A device as claimed in claim 1, characterized in that the optical transmission through the mixing rod amounts to at least 99.98% measured on a wavelength of 660 nm.

10. A device as claimed in claim 1, characterized in that the mixing rod is a polycarbonate fibre having a cladding.

11. A device as claimed in claim 1, characterized in that the mixing rod has a core of pure fused silica and a cladding of fused silica.

12. A device as claimed in claim 1, characterized in that the mixing rod has a cladding of a light reflective material.

13. A device as claimed in claim 1, characterized in that the mixing rod has a numerical aperture of between 0.40 and 0.70 matched to the corresponding fibers.

14. A device as claimed in claim 1, characterized in that the forwarded end of each connector is received in a tubular housing, which also receives a respective optical end of the mixing rod a refractive index matching material being disposed in the interface between said optical ends in the housing.

15. A device as claimed in claim 1 further characterized by a first tubular housing having a first axial rear bore portion receiving the forward end of the first tubular connector, and a second tubular housing having a first axial rear bore portion receiving the forward end of the second tubular connector, each housing having an axial, forward, second bore portion of smaller cross-sectional area than said first portion, communicating with the first bore portion and receiving a respective optical end of the mixing rod.

16. A device as claimed in claim 15, characterized in that each housing is made of a low refractive index material, the difference in refractive index between the housing and the core of the mixing rod resulting in a numerical aperture of 0.50, or at least being matched to the mixing rod.

17. A tubular connector for use in the optical coupling device as claimed in any preceding claim for confining a bundle of optical fibers, the connector having a forward end and a rear end; characterized in that the rear end has a flared, internally smooth, fibre lead-in mouth, there being formed in the wall of the connector a series of internal peripheral, fibre guiding grooves of smoothly arcuate concave cross-section and of identical dimensions and configuration matched to the fibre diameter and communicating with the mouth and opening into the forward end of the connector, the grooves being uniformly spaced from each other about the longitudinal axis of the connector, each groove having a fibre lead-in rear end portion which tapers both in width and in depth towards said mouth.

18. A tubular connector as claimed in claim 17, characterized in that the mouth is of circular crosssection, and in that the grooves are arranged in a circular array.

19. A method of confining a number of optical fibers by inserting the fibers axially into a tubular connector, for interfacing optical ends of the fibers with an optical end of a light mixing rod or large core optical wave guide;

the method comprising the steps of providing a tubular connector which is formed with a number n-x of axially extending internal peripheral grooves opening into a forward end of the connector, and a rearwardly flared mouth communicating with the grooves and opening into a rear end of the tubular connector;

inserting the fibers simultaneously into the connector guided by the flared mouth so that the leading end of each fibre protrudes slightly beyond the forward end of the connector, and so that each groove receives a respective fibre, whereby all of the fibers are held in parallel relationship with the longitudinal axis of the connector; bonding the fibers into the connector by means of a bonding material matched to the cladding of the fibre;

allowing the bonding material to cure; and polishing the leading ends of the fibers flat and perpendicular to the longitudinal axis of the connector to provide optical ends thereon level with the forward end of the connector.

* * * * *